United States Patent [19]

Serini et al.

[11] 3,879,347

[45] Apr. 22, 1975

[54] HIGH MOLECULAR, STATISTICAL COPOLYCARBONATES

[75] Inventors: Volker Serini; Hugo Vernaleken, both of Krefeld; Hermann Schnell, Krefeld-Uerdingen, all of Germany

[73] Assignee: Bayer Aktiengesellschaft, Leverkusen, Germany

[22] Filed: June 20, 1972

[21] Appl. No.: 264,643

[30] Foreign Application Priority Data
Mar. 11, 1972 Germany............................ 2211957

[52] U.S. Cl.... 260/47 XA; 260/37 PC; 260/33.6 R; 260/49; 260/DIG. 24
[51] Int. Cl...................... C08g 17/005; C08g 17/13
[58] Field of Search................................ 260/47 XA

[56] References Cited
UNITED STATES PATENTS
3,038,874  6/1962  Laakso et al................... 260/47 XA
3,220,977  11/1965  Jackson et al................. 260/47 XA
3,729,447  4/1973  Haberland et al............. 260/47 XA
3,737,409  6/1973  Fox................................. 260/47 XA

*Primary Examiner*—Wilbert J. Briggs, Sr.
*Attorney, Agent, or Firm*—Lawrence S. Pope

[57]  ABSTRACT

Statistical copolycarbonates based on aromatic dihydroxy compounds and containing at least 50 mole % of identical or different structural units of the general formula:

$$\left[ -O - \underset{R}{\underset{|}{\underset{\phantom{X}}{\overset{R}{\overset{|}{\bigcirc}}}}} - X - \underset{R'}{\underset{|}{\underset{\phantom{X}}{\overset{R'}{\overset{|}{\bigcirc}}}}} - O - \underset{\underset{O}{\|}}{C} - \right]$$

19 Claims, No Drawings

HIGH MOLECULAR, STATISTICAL COPOLYCARBONATES

The present invention relates to new copolycarbonates, to their production, and to their use.

This invention provides statistical copolycarbonates based on aromatic dihydroxy compounds and containing at least 50 mole % of identical or different co-condensed structural units of the general formula

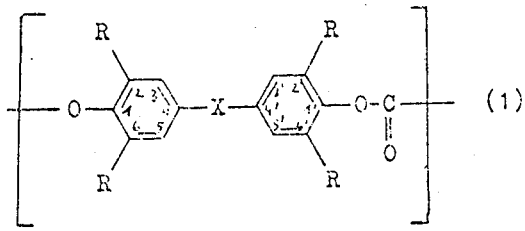

in which
R is $-CH_3$, $-C_2H_5$, or $-CH(CH_3)_2$; and
X is a single bond, an alkylene or alkylidene radical with up to 5 carbon atoms, a cycloalkylene or cycloalkylidene radical with 5 to 15 carbon atoms, oxygen, carbonyl, or a radical of the general formula:

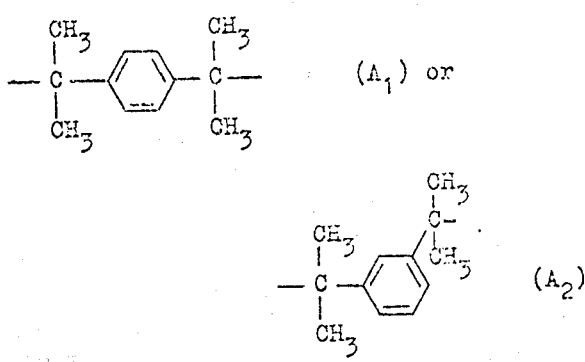

As a result of the statistical incorporation of the 2,6,2',6'-tetra-alkyl-substituted structural units of the formula 1, the new copolycarbonates according to the invention have an increased stability towards saponification, for example relative to comparable copolycarbonates which do not contain any co-condensed 2,6,2',6'-tetra-alkylated structural units of the type of the formula 1.

They furthermore possess better toughness, which manifests itself, for example, by a good elongation at break, as compared to the copolycarbonates described in German Offenlegungsschrift (German Published Specification) No. 1,570,703, in which polycarbonate blocks of an average of 15 to 25 structural units of a type comparable to the formula 1 are linked via other polycarbonate structural units of the general formula 2

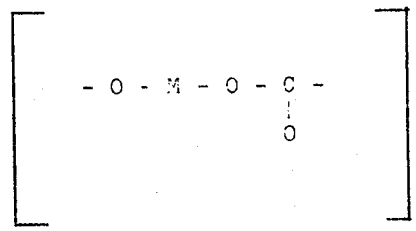

in which
M is a bifunctional aromatic radical.

This invention also provides a process for the production of the new copolycarbonates defined above, in which at least one bisphenol of the general formula:

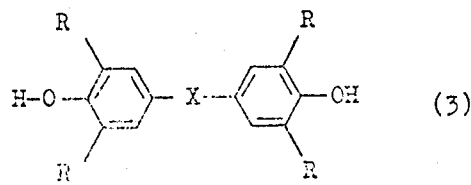

(in which R and X are as defined above) and/or a mono- and/or a bis-chlorocarbonic acid ester thereof is reacted with an at most equimolar amount relative to the said bisphenol of at least one other dihydroxy aromatic compound and/or a mono- and/or a bis-chlorocarbonic acid ester thereof, and, optionally, with phosgene, in such proportions as to provide at least 1.05 equivalent of chlorine bonded via carbonyl per hydroxyl equivalent, in a two-phase mixture of inert organic solvent and alkaline aqueous phase in the presence of 0.012 to 0.3 mole of aliphatic tertiary amine per liter of two-phase mixture.

The amount of phosgene used, if any, will depend upon the proportion of chlorine equivalent bonded via carbonyl per hydroxyl equivalent in the two bifunctional aromatic reactants.

Thus, in one form of the invention, at least one bisphenol of the general formula (3) is reacted with at most an equimolar amount of the said at least one other aromatic dihydroxy compound, in the presence of sufficient phosgene to provide at least 1.05 equivalent of chlorine bonded via carbonyl per hydroxyl equivalent. Clearly, under these conditions, when both aromatic reactants are unesterified bisphenols, all the necessary proportions of chlorine equivalent must be provided by phosgene.

In other form of the present invention, a mono- and/or a bis-chlorocarbonic acid ester of at least one bisphenol of general formula (3) is reacted with at most an equimolar amount of a mono- and/or a bis-chlorocarbonic acid ester of the said at least one other aromatic dihydroxy compound in such proportions as to provide at least 1.05 equivalents of chlorine bonded via carbonyl per hydroxyl equivalent, in the absence of phosgene. It will be understood that under such conditions, when all the required chlorine equivalents are provided in the form of chlorocarbonic acid ester groups, no extra phosgene is required.

In the process of the invention it is also possible to react a mixture of at least one bisphenol of general formula (3) and its mono- and/or bis-chlorocarbonic acid ester with the said at least one other aromatic dihydroxy compound, or to react at least one bisphenol of general formula (3) with a mixture of the said at least one other aromatic dihydroxy compound and its mono- and/or bis-chlorocarbonic acid ester, or to react a mixture of the bisphenol of general formula (3) and its mono- and/or bis-chlorocarbonic acid ester with a mixture of the said at least one other aromatic dihydroxy compound and its mono- and/or bis-chlorocarbonic acid ester. In all these cases, all of which are processes according to the invention, the required proportion of chlorine equivalent will, if necessary, be made up by the addition of phosgene.

The process according to the invention has the advantage that it takes place in a single stage, reaction times of between 0.05 hour and 5 hours being necessary.

The process can be used to manufacture high molecular copolycarbonates with molecular weights of over 20,000, even with molecular weights of over 200,000.

The statistical co-condensation according to the invention, to give high molecular copolycarbonates with good mechanical properties, with quantitative incorporation of the bisphenols of the formula (3), was not to be expected from the state of the art (see pages 3/4 of German Offenlegungsschrift (German published specification) No. 1,570,703).

Furthermore, the co-polycondensation in the presence of such high amine concentrations, to give high molecular copolycarbonates with quantitative conversion of aromatic bis-hydroxy compounds tetra-alkylated in the o,o',o'',o'''-position to the OH groups, and of other aromatic bis-hydroxy compounds was not to be expected. This is because, for example, in the analogous reaction of 2,2-bis-(4-hydroxyphenyl)-propane with phosgene small amounts of amine, for example 0.0005 to 0.0015 mol of triethylamine/litre of two-phase mixture, already suffice to produce high molecular polycarbonates in a short time (5 to 15 minutes). Against this, a higher amine concentration, say 0.004 to 0.010 mol of triethylamine/liter of two-phase mixture, admittedly also still gives high molecular polycarbonates, but here the conversion of 2,2-bis-(4-hydroxyphenyl)-propane (bisphenol A) is greatly reduced so that with the incresing amount of amine increasing proportions of bisphenol A are left in the aqueous-alkaline phase.

Equally, as is disclosed by German Auslegeschrift (German published specification) No. 1,190,185 (page 1), amine concentrations of more than 1.0 mol %, relative to the bis-phenol present, are of disadvantage to the formation of polycarbonate if phenol or substituted phenols are used as chain stoppers.

The process according to the invention has the advantage that the starting bisphenols or their mono- or bis-chlorocarbonic acid esters can be added all at once to the reaction solution and that extremely high molecular products (molecular weight > 200,000) can be obtained by the process. Thus, good regulation of the molecular weight is achievable with chain stoppers.

The structural units of the formula (1) are based, for example, on the following bisphenols of the formula (3): bis-(3,5-dimethyl-4-hydroxyphenyl)-methane, bis-(3,5-diisopropyl-4-hydroxyphenyl)-methane, 2,2-bis-(3-methyl-5-isopropyl-4-hydroxyphenyl)-propane, 2,2-bis-(3,5-dimethyl-4-hydroxyphenyl)-propane, 2,2-bis-(3,5-diethyl-4-hydroxyphenyl)propane, 3,3-bis-(3,5-dimethyl-4-hydroxyphenyl)-pentane, 1,1-bis-(3,5-dimethyl-4-hydroxyphenyl)-cyclohexane, 1,4-bis-(3,5-dimethyl-4-hydroxyphenyl)-cyclohexane, bis-(3,5-dimethyl-4-hydroxyphenyl)-ether, bis-(3,5-dimethyl-4-hydroxyphenyl), bis-(3,5-dimethyl-4-hydroxyphenyl)-carbonyl, α,α'-bis-(3,5-dimethyl-4-hydroxyphenyl)-p-diisopropylbenzene and α,α'-bis-(3,5-dimethyl-4-hydroxyphenyl)-m-diisopropylbenzene.

The synthesis of these bisphenols, where it is not already known, is described in German Patent application No. P 20 63 052 (Le A 13 425; U.S. application Ser. No. 209,420, Mo 1266 S, of the same inventors, filed Dec. 17, 1971 by the same assignee).

Examples of other aromatic bis-hydroxy compounds which can be co-polycondensed with the tetra-alkyl-substituted bisphenols of the formula (3) are: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, α,α'-bis-(hydroxyphenyl)-diisopropylbenzenes and their nuclear-halogenated and nuclear-alkylated compounds, exceptionally those corresponding to formula (3). These and further suitable aromatic dihydroxy compounds are described in U.S. Pat. Nos. 3,028,365, 2,999,835, 3,148,172, 3,271,368, 2,991,273, 3,271,367, 3,280,078, 3,014,891 and 2,999,846 and in German Offenlegungsschrift (German published specification) No. 1,570,703. Examples of some preferred bisphenols are: 4,4'-dihydroxydiphenyl, 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and α,α'-bis-(4-hydroxyphenyl)-p-diisopropylbenzene.

The process for the manufacture of the statistical copolycarbonates according to the invention uses an interfacial (phase boundary) condensation in which the reaction of the starting compounds (bisphenols, mono- or bis-chlorocarbonic acid esters and phosgene) takes place, preferably in the presence of aqueous alkali and a suitable solvent for the copolycarbonates, and the co-condensation to give high molecular polycarbonate is effected by adding at least 0.012 mol of aliphatic tertiary amines/liter of two-phase mixture.

For example, the bisphenols to be reacted can be together dissolved in aqueous alkali, preferably in sodium hydroxide sollution or potassium hydroxide solution, and a suitable solvent for the polycarbonate being produced is added. Suitable solvents include chlorinated paraffins, such as methylene chloride, chloroform and 1,2-dichloroethane, but also chlorinated aromatics, such as chlorobenzene, dichlorobenzene and chlorotoluene. Phosgene is passed into this mixture with vigorous stirring. In the case of bisphenols which because of their hydrophobic character do not give bisphenolate solutions, a suspension of bisphenolate in aqueous alkali is advantageously used.

The amount of phosgene required depends on the bisphenols employed, the stirring action and the reaction temperature, which can be between 10°C and 90°C, and is at least 1.05 mol per mol of bisphenol, generally 1.1 to 3.0 mols of phosgene per mol of bisphenol. After the phosgenation, which can also be carried out with chain stoppers, for example 2,6-dimethylphenol, phenol or p-tertiary butylphenol already present, the condensation to give a high molecular polycarbonate is effected by adding aliphatic tertiary amine, for example triethylamine, dimethylbenzylamine or triethylenediamine, as the catalyst. The amounts of amine are generally 0.012 to 0.3 mol/liter of two-phase mixture, 0.012 to 0.1 mol/liter of two-phase mixture being used preferentially; a reaction time of 5 to 1.5 hours is generally sufficient. The statistical copolycarbonates thus manufactured can be isolated in accordance with known processes, for example by separating off the aqueous phase, repeatedly washing the organic phase with water until free of electrolyte and thereafter precipitating the copolycarbonate or evaporating off the solvent. The copolycarbonates thus obtained do not contain any saponifiable chlorine constituents.

The statistical copolycarbonates according to the invention are excellent thermoplastics which were not hitherto obtainable. They are distinguished, relative to other polycarbonates, such as, for example, the polycarbonate from 2,2'-bis-(4-hydroxyphenyl)-propane, by excellent stability to saponification, for example to hot, aqueous NaOH and HCl solutions (see Tables 1 and 2). They generally possess glass temperatures of above 160°C (see Examples 1 to 4) and very good toughness. Thus, for example, they considerably surpass the elongation at break of comparable block copolymers which are obtained in accordance with the process described in DOS No. 1,570,703. This can be seen from Example 4: the statistical copolycarbonate obtained there, which has been manufactured from the same bisphenols, in the same ratio, as the block copolycarbonate in Example 3 of German Offenlegungsschrift (German published specification) No. 1,570,703, is distinguished by twice as high an elongation.

The statistical copolymers according to the invention lend themselves very well to processing into mouldings, sheets, films, fibres and bristles. They can also be used well in mixtures with fillers, for example minerals or carbon black, with substances which produce special effects, and with glass fibres, pigments, dyestuffs, stabilisers, for example against UV light, and other additives. They can also be mixed with other polymer materials. In particular, they can be employed with great advantage where high resistance to hydrolysis and toughness matter. Thus they can serve, for example, for the manufacture of pipelines for hot alkaline or acid solutions, of high quality gaskets, of crockery and of instruments which can be sterilised with hot steam. Because of the good solubility in solvents, such as, for example, toluene and xylene, they can also be used as lacquers, for example for the coating of plastics. Of course, the copolycarbonates of the present invention are also usable in all other fields of use where the polycarbonates hitherto known have been employed.

EXAMPLE 1

Manufacture of high molecular statistical copolycarbonate of 2,2-bis-(3,5-dimethyl-4-hydroxyphenyl)-propane and 2,2-bis-(4-hydroxyphenyl)-propane (75/25 mol units)

18.4 g (0.46 mol) of NaOH were dissolved in 600 ml of water and 600 ml of $CH_2Cl_2$, 42.6 g (0.15 mol) of 2,2-bis-(3,5-dimethyl-4-hydroxyphenyl)-propane and 5.2 g (0.05 mol) of 2,2-bis-(4-hydroxyphenyl)-propane were then added whilst stirring. 44.5 g of phosgene (0.45 mol) were then passed in as a gas whilst stirring vigorously. After the introduction of the phosgene, 2.02 g (0.02 mol) of triethylamine were added and the mixture was vigorously stirred for 3 hours. The entire reaction was carried out under $N_2$ and at 20° – 25°C. During the introduction of the $COCl_2$ and the subsequent stirring, the pH-value of the aqueous phase was kept at pH 13 by dropwise addition of NaOH. Following the completion of stirring, the batch was worked up. The aqueous phase was free of bisphenolate. The organic phase was diluted with 1,000 ml of $CH_2Cl_2$ and was then twice washed with 1,000 ml of 5% strength aqueous phosphoric acid and subsequently with $H_2O$ until free of electrolyte. The $CH_2Cl_2$ solution was dried over $Na_2SO_4$ and concentrated. Films were spread from the main part of the concentrated solution. The remaining solution was evaporated. The films, and the polycarbonate from the remaining solution, were dried. The yield of copolycarbonate was 58 g. The glass temperature of the polymer was 198°C. Measurements on the film showed an elongation at break, $\epsilon_R$, of 95%. The molecular weight was $\overline{M}_w = 208,000$. The relative viscosity was $\eta_{rel} = 2.43$ (0.5 g in 100 ml of $CH_2Cl_2$ solution at 25°C).

EXAMPLE 2

Manufacture of high molecular statistical copolycarbonate from 2,2-bis-(3,5-dimethyl-4-hydroxyphenyl)-propane and 2,2-bis-(3,5-dibromo-4-hydroxyphenyl)-propane (95/5 mol units) with 2,6-dimethylphenol as the chain stopper 18.4 g (0.46 mol) of NaOH were dissolved in 600 ml of $H_2O$ and 600 ml of $CH_2Cl_2$, 54 g (0.19 mol) of 2,2-bis-(3,5-dimethyl-4-hydroxyphenyl)-propane and 5.4 g (0.01 mol) of 2,2-bis-(3,5-dibromo-4-hydroxyphenyl)-propane and 0.585 g (0.0048 mol) 2,6-dimethylphenol were then added whilst stirring. 49.5 g (0.5 mol) of phosgene were then introduced as a gas, with vigorous stirring. After the introduction of the phosgene, 2.02 g (0.02 mol) of triethylamine were added and the mixture was vigorously stirred for 3 hours. The entire reaction was carried out under $N_2$ and at 20° – 25°C. During the introduction of the phosgene, a pH of 11 – 13 was maintained, and after the addition of triethylamine a pH of 13 was maintained, by dropwise addition of 50% strength NaOH. Following the completion of stirring, the batch was worked up as in Example 1. The aqueous phase was free of bisphenolate. The yield of copolycarbonate was 62 g. The glass temperature of the polymer was 197°C. The 60 μm thick film, which burnt in a flame but did not drip, became extinguished immediately outside the flame. The relative viscosity was $\eta_{rel} = 1.302$ (0.5 g/100 ml of $CH_2Cl_2$ solution at 25°C). The molecular weight $\overline{M}_w$ was 39,900.

EXAMPLE 3

Manufacture of high molecular statistical copolycarbonate from the bis-chlorocarbonic acid ester of 2,2-bis-(3,5-dimethyl-4-hydroxyphenyl)-propane and 4,4'-dihydroxydiphenyl (70/30 mol units)

24 g (0.60 mol) of NaOH were dissolved in 600 ml of water and 11.2 g (0.06 mol) of 4,4'-dihydroxydiphenyl, 57.3 g (0.14 mol) of bis-chlorocarbonic acid ester of 2,2-bis-(3,5-dimethyl-4-hydroxyphenyl)-propane, dissolved in 600 ml of $CH_2Cl_2$, and 2.02 g (0.02 mol) of triethylamine were then added whilst stirring. The mixture was then vigorously stirred for 3 hours. The reaction was carried out under $N_2$ and at 20° – 25°C. The batch was worked up analogously to Example 1. The aqueous phase was free of bisphenolate. The yield of copolycarbonate was 54 g. The relative viscosity of the polymer was $\eta_{rel} = 1.825$ (0.5 g/100 ml of $CH_2Cl_2$ solution at 25°C). The molecular weight was $\overline{M}_w = 113,000$. Measurements on the film showed an elongation at break $\epsilon_R$ of 91%. The glass temperature of the polymer was 201°C.

EXAMPLE 4

Manufacture of high molecular, statistical copolycarbonate from the bis-chlorocarbonic acid esters of 2,2-bis-(3,5-dimethyl-4-hydroxyphenyl)-propane and 2,2-bis-(4-hydroxyphenyl)-propane (80/20 mol units)

33.2 g of NaOH were dissolved in 600 ml of water and 65.5 g (0.16 mol) of bis-chlorocarbonic acid ester of 2,2-bis-(3,5-dimethyl-4-hydroxyphenyl)-propane and 14.1 g (0.04 mol) of bis-chlorocarbonic acid ester of 2,2-bis-(4-hydroxyphenyl)-propane, conjointly dissolved in 600 ml of $CH_2Cl_2$, and 2.02 g (0.02 mol) of triethylamine were then added whilst stirring. The mixture was then vigorously stirred for 3 hours. The reaction was carried out under $N_2$ and at 20° – 25°C. The batch was worked up analogously to Example 1. The aqueous phase was free of bisphenolate. The yield was 57 g of polymer. The relative viscosity $\eta_{rel}$ of the polymer was 2.273. The molecular weight was $\overline{M}_w$ = 200,000. The glass temperature of the polymer was 202°C. The measurement of the elongation at break of the film showed $\epsilon_R = 97\%$.

EXAMPLE 5

Resistance of the statistical copolycarbonates according to the invention to 10% strength aqueous sodium hydroxide at 100°C.

Decrease in weight of pieces of film 4 × 5 cm, approx. 70 – 100 μm thick, weight 150 – 200 mg. Before being weighed out, the pieces of film were washed with water and dried.

| Treatment | Decrease in Weight in mg for Polycarbonates | | | | | |
|---|---|---|---|---|---|---|
| Time in hours | Homopolycarbonate from Bisphenol A, for Comparison *) | from Example | | | | |
| | | 1 | 2 | 3 | 4 | |
| 500 | completely dissolved | 0 | 0 | 0 | 0 | mg |

EXAMPLE 6

Resistance of the statistical copolycarbonates according to the invention to 10% strength aqueous hydrochloric acid at 100°C
Pieces of film 70 – 100 μm thick
$u$ = unchanged clear and tough

| Treatment | Properties of the Films of Polycarbonates | | | | |
|---|---|---|---|---|---|
| Time in hours | Homopolycarbonate from Bisphenol A, for Comparison *) | from Example | | | |
| | | 1 | 2 | 3 | 4 |
| 500 | disintegrated | u | u | u | u |

Re Examples 5 and 6
*) The homopolycarbonate of 2,2-bis-(4-hydroxyphenyl)-propane which was employed had a relative viscosity of 1.30 (0.5 g in 100 ml of $CH_2Cl_2$ solution at 25°C) and a molecular weight $\overline{M}_w$ of 31,100.

What we claim is:

1. Statistical copolycarbonates based on aromatic dihydroxy compounds and comprising at least 50 mol % of identical or different tetraalkylated structural units of the general formula

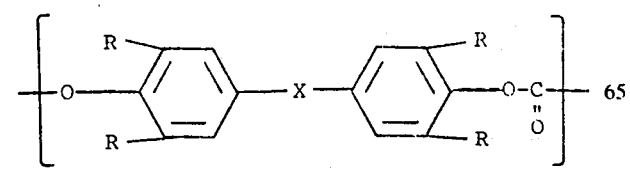

where R is —$CH_3$, —$C_2H_5$ or —$CH(CH_3)_2$ and X is a single bond, an alkylene or alkylidene radical with up to 5 carbon atoms or a cyclohexylene radical or a cyclohexylidene radical and the copolycarbonate has a molecular weight, Mw of more than 20,000.

2. The copolycarbonates of claim 1 wherein the tetraalkylated structural units are residues of aromatic dihydroxy compounds selected from the group consisting of: bis-(3,5-dimethyl-4-hydroxyphenyl)-methane and 2,2-bis-(3,5-dimethyl-4-hydroxyphenyl)-propane and the remaining structural units are residues of aromatic dihydroxy compounds selected from the group consisting of: 2,2-bis-(4-hydroxyphenyl)-propane, 2,2-bis-(3,5-dichloro-4-hydroxyphenyl)-propane and 2,2-bis-(3,5-dibromo-4-hydroxyphenyl)-propane.

3. The copolycarbonates of claim 1 containing no saponifiable chlorine constituents.

4. The copolycarbonates of claim 1 wherein the remaining structural units are residues of aromatic dihydroxy compounds selected from the group consisting of: hydroquinone; resorcinol; dihydroxydiphenyls; bis-(hydroxyphenyl)-alkanes; bis-(hydroxyphenyl)-cycloalkanes; bis-(hydroxyphenyl)-sulfides; bis-(hydroxyphenyl)-ethers; bis-(hydroxyphenyl)-ketones; bis-(hydroxyphenyl)-sulfoxides; bis-(hydroxyphenyl)-sulfones and α,α'-bis-(hydroxyphenyl)-diisopropylbenzenes.

5. The copolycarbonates of claim 1 wherein the remaining structural units are residues of aromatic dihydroxy compounds selected from the group consisting of: 4,4'-dihydroxydiphenyl; 2,2-bis-(4-hydroxyphenyl)-propane; 2,2-bis-(3,5-dichloro-4-hydroxyphenyl)-propane; 2,2-bis-(3,5-dibromo-4-hydroxyphenyl)-propane and α,α'-bis-(4-hydroxyphenyl)-p-diisopropylbenzene.

6. The copolycarbonates of claim 1 wherein the tetraalkylated structural units are residues of aromatic dihydroxy compounds selected from the group consisting of: bis-(3,5-dimethyl-4-hydroxyphenyl)-methane; bis-(3,5-diisopropyl-4-hydroxyphenyl)-methane; 2,2-bis-(3-methyl-5-isopropyl-4-hydroxyphenyl)-propane; 2,2-bis-(3,5-dimethyl-4-hydroxyphenyl)-propane; 2,2-bis-(3,5-diethyl-4-hydroxyphenyl)-propane; 3,3-bis-(3,5-dimethyl-4-hydroxyphenyl)-pentane; 1,1-bis-(3,5-dimethyl-4-hydroxyphenyl)-cyclohexane; 1,4-bis-(3,5-dimethyl-4-hydroxyphenyl)-cyclohexane.

7. The copolycarbonates of claim 1 wherein the tetraalkylated structural units are residues of 2,2-bis-(3,5-dimethyl-4-hydroxyphenyl)-propane.

8. A process for the production of the copolycarbonates of claim 1 comprising reacting at least one tetraalkylated aromatic dihydroxy compound of the formula

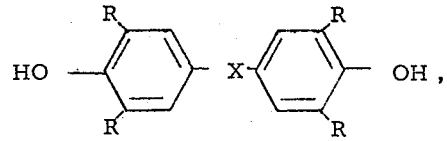

where X and R are as defined above,
and/or a mono- and/or a bis-chloro-carbonic acid ester thereof, with at most an equimolar amount, relative to the tetraalkylated aromatic dihydroxy compounds, of at least one other aromatic dihydroxy compound and/or a mono- and/or a bis-chlorocarbonic acid ester thereof, and phosgene in a two-phase mixture of inert organic solvent and alkaline aqueous phase in the presence of 0.012 to 0.3 mol of aliphatic tertiary amine per liter of two-phase mixture for a time sufficient to produce copolycarbonates essentially free of saponifiable chlorine constituents; the amount of phosgene employed being that amount required along with the amount of chlorocarbonic acid ester to provide at least 1.05 equivalents of chlorine-bonded-via-carbonyl per hydroxyl equivalent.

9. The process of claim 8 wherein a mono- and/or bis-chlorocarbonic acid ester of at least one tetraalkylated aromatic dihydroxy compound is reacted with a mono- and/or bis-chlorocarbonic acid ester of the at least one other aromatic dihydroxy compound in the absence of phosgene.

10. The process of claim 8 wherein the at least one tetraalkylated aromatic dihydroxy compound is reacted with the at least one other aromatic dihydroxy compound and phosgene and wherein all of the at least 1.05 equivalents of chlorine-bonded-via-carbonyl per hydroxyl equivalent is provided by the phosgene.

11. The process of claim 8 carried out in the presence of a chain stopper.

12. The process of claim 8 wherein the at least one tetraalkylated aromatic dihydroxy compound is selected from the group consisting of: bis-(3,5-dimethyl-4-hydroxyphenyl)-methane; bis-(3,5-diisopropyl-4-hydroxyphenyl)-methane; 2,2-bis-(3-methyl-5-isopropyl-4-hydroxyphenyl)-propane; 2,2-bis-(3,5-dimethyl-4-hydroxyphenyl)-propane; 2,2-bis-(3,5-diethyl-4-hydroxyphenyl)-propane; 3,3-bis-(3,5-dimethyl-4-hydroxyphenyl)-pentane; 1,1-bis-(3,5-dimethyl-4-hydroxyphenyl)-cyclohexane; 1,4-bis-(3,5-dimethyl-4-hydroxyphenyl)-cyclohexane.

13. The process of claim 8 wherein the at least one tetraalkylated aromatic dihydroxy compound is 2,2-bis-(3,5-dimethyl-4-hydroxyphenyl)-propane.

14. The process of claim 8 wherein the at least one other aromatic dihydroxy compound is selected from the group consisting of: hydroquinone; resorcinol; dihydroxydiphenyls; bis-(hydroxyphenyl)-alkanes; bis-(hydroxyphenyl)-cycloalkanes; bis-(hydroxyphenyl)-sulfides; bis-(hydroxyphenyl)-ethers; bis-(hydroxyphenyl)-ketones; bis-(hydroxyphenyl)-sulfoxides; bis-(hydroxyphenyl)-sulfones and $\alpha,\alpha'$-bis-(hydroxyphenyl)-diisopropylbenzenes.

15. The process of claim 8 wherein the at least one other aromatic dihydroxy compound is selected from the group consisting of: 4,4'-dihydroxydiphenyl; 2,2-bis-(4-hydroxyphenyl)-propane; 2,2-bis-(3,5-dichloro-4-hydroxyphenyl)-propane; 2,2-bis-(3,5-dibromo-4-hydroxyphenyl)-propane and $\alpha,\alpha'$-bis-(4-hydroxyphenyl)-p-diisopropylbenzene.

16. The process of claim 8 wherein the aliphatic tertiary amine concentration is 0.012 to 0.1 mol per liter of two-phase mixture.

17. The process of claim 8 wherein the reaction time is 0.05 to 5 hours.

18. The process of claim 8 wherein the aliphatic tertiary amine is selected from the group consisting of triethylamine, dimethyl benzyl amine or triethylene diamine.

19. The process of claim 18 wherein the aliphatic tertiary amine is triethylamine.

* * * * *